(12) United States Patent
Urienza et al.

(10) Patent No.: US 9,472,943 B2
(45) Date of Patent: Oct. 18, 2016

(54) OFFLINE POWER CONVERTER AND THE METHOD THEREOF

(71) Applicant: Monolithic Power Systems, Inc., San Jose, CA (US)

(72) Inventors: Joseph Urienza, Milpitas, CA (US); Peng Liu, Hangzhou (CN)

(73) Assignee: MONOLITHIC POWER SYSTEMS, INC., San Jose, CA (US)

( * ) Notice: Subject to any disclaimer, the term of this patent is extended or adjusted under 35 U.S.C. 154(b) by 789 days.

(21) Appl. No.: 13/862,078

(22) Filed: Apr. 12, 2013

(65) Prior Publication Data

US 2014/0307491 A1    Oct. 16, 2014

(51) Int. Cl.
*H02M 7/217* (2006.01)
*H02H 7/125* (2006.01)

(52) U.S. Cl.
CPC ........... *H02H 7/1252* (2013.01); *H02M 7/217* (2013.01); *H02M 7/2176* (2013.01)

(58) Field of Classification Search
CPC . G05F 1/56; H02M 2001/0045; H02M 1/32; H02M 7/217; H02M 7/2176; H02H 7/125; H02H 7/1252
USPC ............ 363/50–52, 76–77, 84–89, 125–128; 323/222–225, 271–275, 279–281, 351
See application file for complete search history.

(56) References Cited

U.S. PATENT DOCUMENTS

| | | | |
|---|---|---|---|
| 5,818,708 A * | 10/1998 | Wong | H02M 7/2176 323/222 |
| 2006/0083038 A1* | 4/2006 | Lynch | H02M 7/2176 363/127 |
| 2013/0077364 A1 | 3/2013 | Urienza et al. | |
| 2013/0077369 A1* | 3/2013 | Swaminathan | H02M 7/2176 363/126 |
| 2014/0043875 A1* | 2/2014 | Hsing | G05F 1/56 363/77 |

* cited by examiner

*Primary Examiner* — Timothy J Dole
*Assistant Examiner* — Ivan Laboy Andino

(57) ABSTRACT

An offline power converter provides low EMI and quick reaction by slowly turning off a power switch at normal operation, and fast turning off the power switch when surge event happens.

7 Claims, 8 Drawing Sheets

US 9,472,943 B2

OFFLINE POWER CONVERTER AND THE METHOD THEREOF

FIELD

The present invention relates to electronic circuits, more specifically, the present invention relates to offline power converters.

BACKGROUND

In offline power supplies, current and voltage slew rates are preferably slow to reduce the EMI (electro-magnetic interference) filter size so that system cost is minimized. However, slow current and voltage slew rates make the system slow to react. For example, if a high voltage surge event such as lighting, inductive voltage kick or any form of high voltage spikes from other sources happens, the system may not react quickly enough to prevent it from being destructed due to the slow reaction.

SUMMARY

In one embodiment, an offline power converter having a normally-on power device, a power switch, a first comparator, a second comparator, and a logic and drive unit provides low EMI and quick reaction by slowly turning off the power switch at normal operation, and fast turning off the power switch when a surge event happens.

The use of the similar reference label in different drawings indicates the same of like components.

DETAILED DESCRIPTION

Embodiments of circuits for offline power converter are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
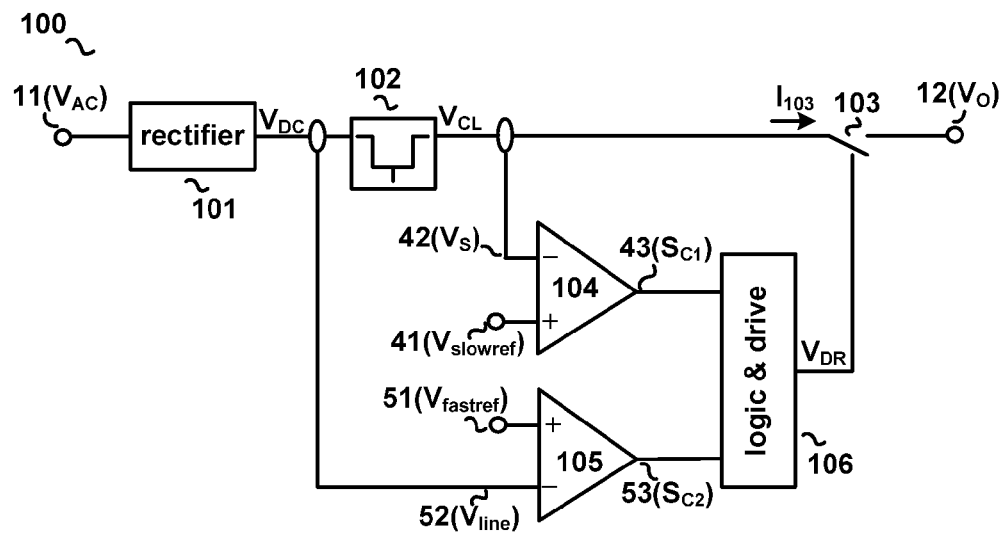
FIG. 1 schematically shows an offline power converter 100 in accordance with an embodiment of the present invention.

FIG. 1 schematically shows an offline power converter 100 in accordance with an embodiment of the present invention. In the example of FIG. 1, the offline power converter 100 comprises: an input port 11 configured to receive an input voltage $V_{AC}$; an output port 12 configured to provide an output voltage $V_O$; a rectifier 101 coupled to the input port 11 to receive the input voltage $V_{AC}$, and to provide a rectified DC voltage $V_{DC}$ based on the input voltage $V_{AC}$; a normally-on power device 102 coupled to the rectifier 101 to receive the rectified DC voltage $V_{DC}$, and to provide a clipped voltage $V_{CL}$ based on the rectified DC voltage $V_{DC}$; a power switch 103, having a first terminal, a second terminal and a control terminal, the first terminal being coupled to the normally-on power device 102 to receive the clipped voltage $V_{CL}$, the second terminal being coupled to the output port 12; a first comparator 104 having a first input terminal 41 configured to receive a first threshold $V_{slowref}$, a second input terminal 42 configured to receive a first sense signal $V_S$ indicative of the clipped voltage $V_{CL}$, and an output terminal 43 configured to provide a first comparison signal $S_{C1}$ based on the first threshold $V_{slowref}$ and the first sense signal $V_S$; a second comparator 105 having a first input terminal 51 configured to receive a second threshold $V_{fastref}$, a second input terminal 52 configured to receive a second sense signal $V_{line}$ indicative of the rectified DC voltage $V_{DC}$, and an output terminal 53 configured to provide a second comparison signal $S_{C2}$ based on the second threshold $V_{fastref}$ and the second sense signal $V_{line}$; and a logic and drive unit 106 having a first input terminal coupled to the output terminal 43 of the first comparator 104 to receive the first comparison signal $S_{C1}$, a second input terminal coupled to the output terminal 53 of the second comparator 105 to receive the second comparison signal $S_{C2}$, and an output terminal configured to provide a driving signal $V_{DR}$ to the control terminal of the power switch 103, the driving signal $V_{DR}$ having a slow-sloping ramp down when the first sense signal $V_S$ goes higher than the first threshold $V_{slowref}$, and a substantial vertical ramp down when the second sense signal $V_{line}$ goes higher than the second threshold $V_{fastref}$.

In one embodiment, the first threshold $V_{slowref}$ and the second threshold $V_{fastref}$ may have hysteresis. However, in other embodiments, the first threshold $V_{slowref}$ and the second threshold $V_{fastref}$ may not have hysteresis.

In one embodiment, the rectifier 101 may execute half-wave rectification. In other embodiments, the rectifier 101 may execute full-wave rectification.

In one embodiment, the normally-on power device 102 may have a pinch-off voltage $V_P$, and the ratio of the first threshold $V_{slowref}$ and the first sense signal $V_S$ may be equal to or lower than the ratio of the pinch-off voltage $V_P$ and the clipped voltage $V_{CL}$, i.e., $$\frac{V_{slowref}}{V_S} \le \frac{V_P}{V_{CL}}$$

In one embodiment, the pinch-off voltage $V_P$ of the normally-on power device 102 may be in the neighborhood of 40 Volts.

In one embodiment, the normally-on power device 102 may comprise a depletion field effect transistor (e.g., JFET, or depletion MOSFET). In other embodiments, the normally-on power device 102 may comprise an enhancement MOSFET.

In one embodiment, the power switch 103 may comprise a MOSFET, a BJT, an IGBT or any other controllable power switch device.

In one embodiment, there is a voltage gap between the first threshold $V_{slowref}$ and second threshold $V_{fastref}$ to avoid interaction, e.g., when the first sense signal $V_S$ reaches the first threshold $V_{slowref}$, the clipped voltage $V_{CL}$ may be approximate 30 Volts; and when the second sense signal $V_{line}$ reaches the second threshold $V_{fastref}$, the rectified DC voltage $V_{DC}$ may be approximate 70 Volts. Assuming the ratio of the first sense signal $V_S$ and the clipped voltage $V_{CL}$ is k1, and the ratio of the second sense signal $V_{line}$ and the rectified DC voltage $V_{DC}$ is k2, then $$\frac{V_{fastref}}{k2} > \frac{V_{slowref}}{k1}$$

The voltage gap may be adjusted either by adjusting the rations k1 and k2, or by adjusting the thresholds $V_{fastref}$ and $V_{slowref}$.

When the offline power converter 100 is in normal operation, the input voltage $V_{AC}$ is turned to the rectified DC voltage $V_{DC}$ via the rectifier 101; the rectified DC voltage $V_{DC}$ is then delivered to the normally-on power device 102. Because the normally-on power device 102 is a normal-ON switch, when the rectified DC voltage $V_{DC}$ is lower than the pinch-off voltage $V_P$ of the normally-on power device 102, the clipped voltage $V_{CL}$ follows the rectified DC voltage $V_{DC}$; and when the rectified DC voltage $V_{DC}$ is higher than the pinch-off voltage $V_P$, the clipped voltage $V_{CL}$ stays at the pinch-off voltage ($V_P$). When a load current is present, $V_{CL}$ may be lower than $V_P$ due to the normally-on power device 102's inherent resistance.

In the following discussion, the operation of the offline power converter 100 is referred to FIG. 2 and FIG. 3. Assuming for purpose of illustration that the rectifier 101 in FIG. 1 executes full-wave rectification.

Figure 2:
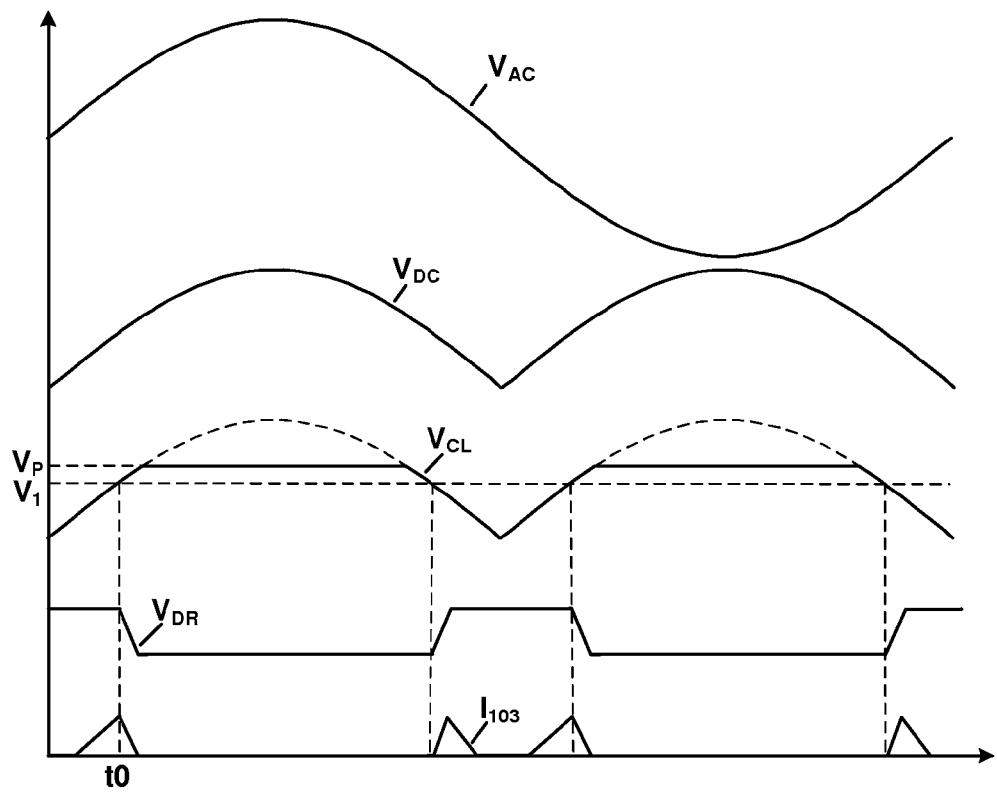
FIG. 2 schematically shows the waveforms of the input voltage $V_{AC}$, the rectified DC voltage $V_{DC}$, the clipped voltage $V_{CL}$, the driving signal $V_{DR}$, and a current $I_{103}$ flowing through the power switch 103 of the offline power converter 100 in FIG. 1 when no high voltage surge event happens.

FIG. 2 schematically shows the waveforms of the input voltage $V_{AC}$, the rectified DC voltage $V_{DC}$, the clipped voltage $V_{CL}$, the driving signal $V_{DR}$, and a current $I_{103}$ flowing through the power switch 103 of the offline power converter 100 in FIG. 1 when no high voltage surge event happens. As shown in FIG. 2, when the rectified DC voltage $V_{DC}$ is lower than the pinch-off voltage $V_P$, the clipped voltage $V_{CL}$ follows the rectified DC voltage $V_{DC}$; and when the rectified DC voltage $V_{DC}$ goes higher than the pinch-off voltage $V_P$, the clipped voltage $V_{CL}$ stays at the pinch-off voltage ($V_P$). When the clipped voltage $V_{CL}$ goes higher than a slow threshold $V_1$ (e.g., 30V) at time point t0, which means that the first sense signal $V_S$ is higher than the first threshold $V_{slowref}$, the driving signal $V_{DR}$ goes down with a slow-sloping ramp, and the current $I_{103}$ flowing through the power switch 103 decreases slowly to meet the EMI requirement.

Figure 3:
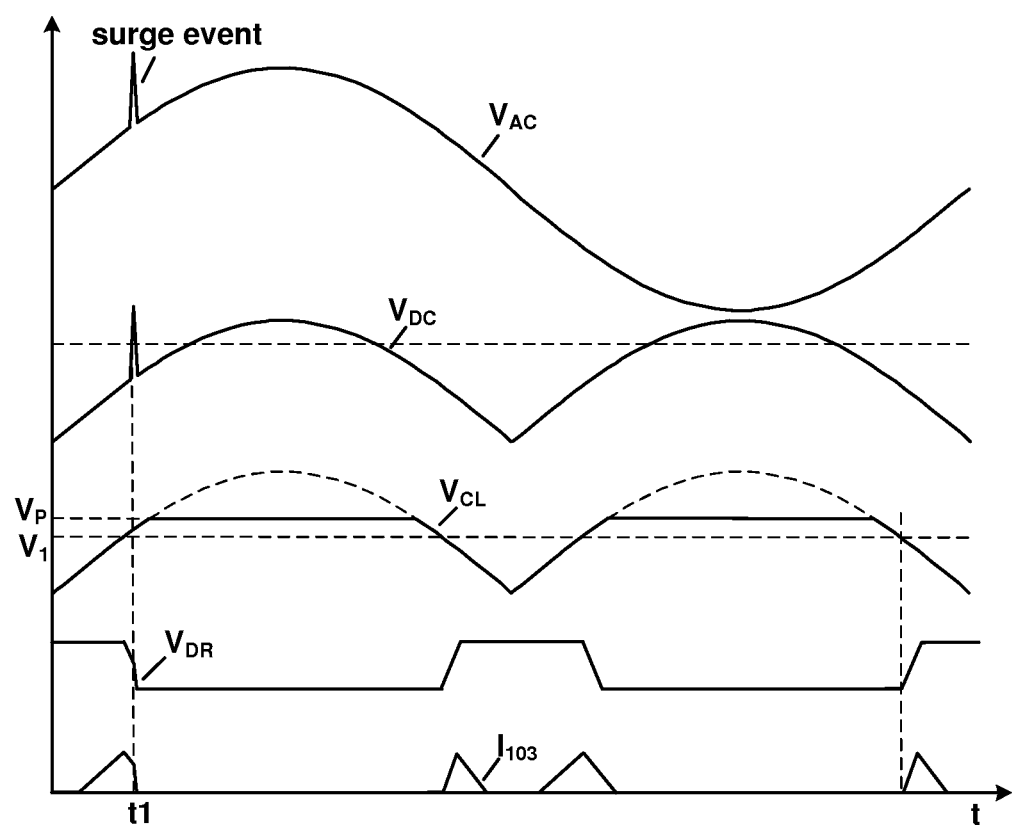
FIG. 3 schematically shows the waveforms of the input voltage $V_{AC}$, the rectified DC voltage $V_{DC}$, the clipped voltage $V_{CL}$, the driving signal $V_{DR}$, and the current $I_{103}$ flowing through the power switch 103 of the offline power converter 100 in FIG. 1 when a high voltage surge event happens.

FIG. 3 schematically shows the waveforms of the input voltage $V_{AC}$, the rectified DC voltage $V_{DC}$, the clipped voltage $V_{CL}$, the driving signal $V_{DR}$) and the current $I_{103}$ flowing through the power switch 103 of the offline power converter 100 in FIG. 1 when a high voltage surge event happens. As shown in FIG. 3, a surge event happens at the input voltage $V_{AC}$ at time t1, which causes the input voltage $V_{AC}$ to increase rapidly suddenly. Accordingly, the second sense signal $V_{line}$ is higher than the second threshold $V_{fastref}$, and the driving signal $V_{DR}$ goes down with a substantial vertical ramp, and the current $I_{103}$ flowing through the power switch 103 decreases rapidly to quickly react to the surge event to protect the system.

Figure 4:
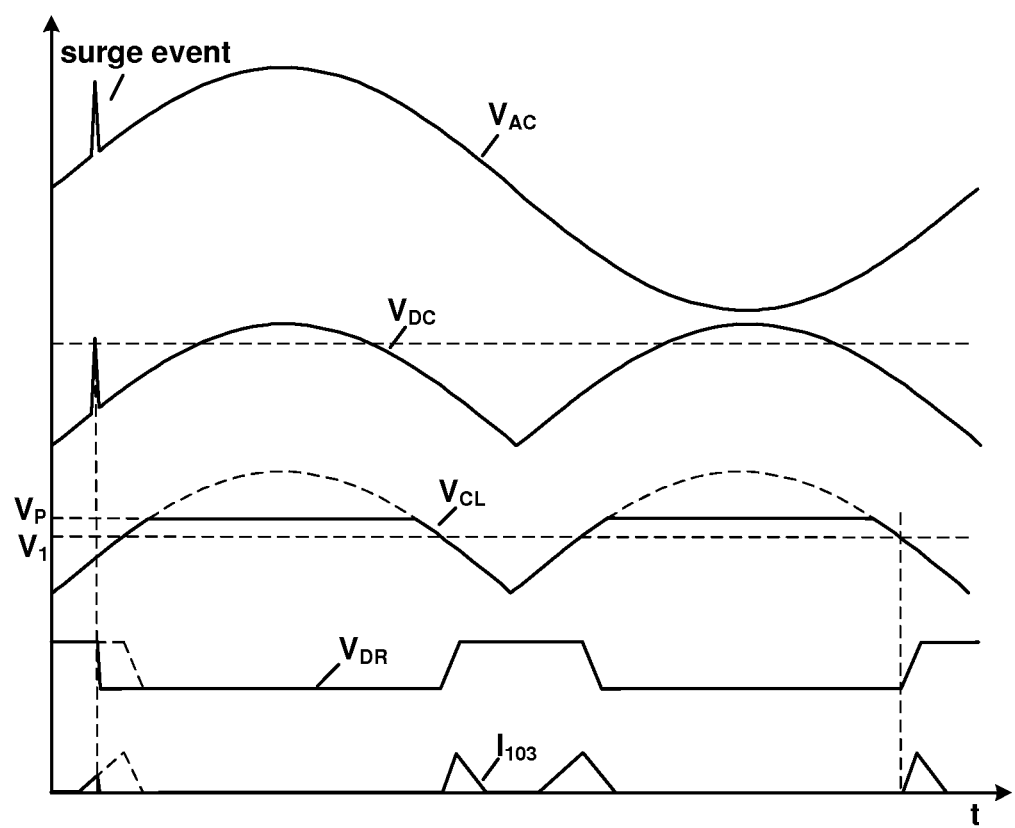
FIG. 4 schematically shows the waveforms of the input voltage $V_{AC}$, the rectified DC voltage $V_{DC}$, the clipped voltage $V_{CL}$, the driving signal $V_{DR}$, and the current $I_{103}$ flowing through the power switch 103 of the offline power converter 100 in FIG. 1 when a high voltage surge event happens during the on-time of the power switch 103.
Figure 5:
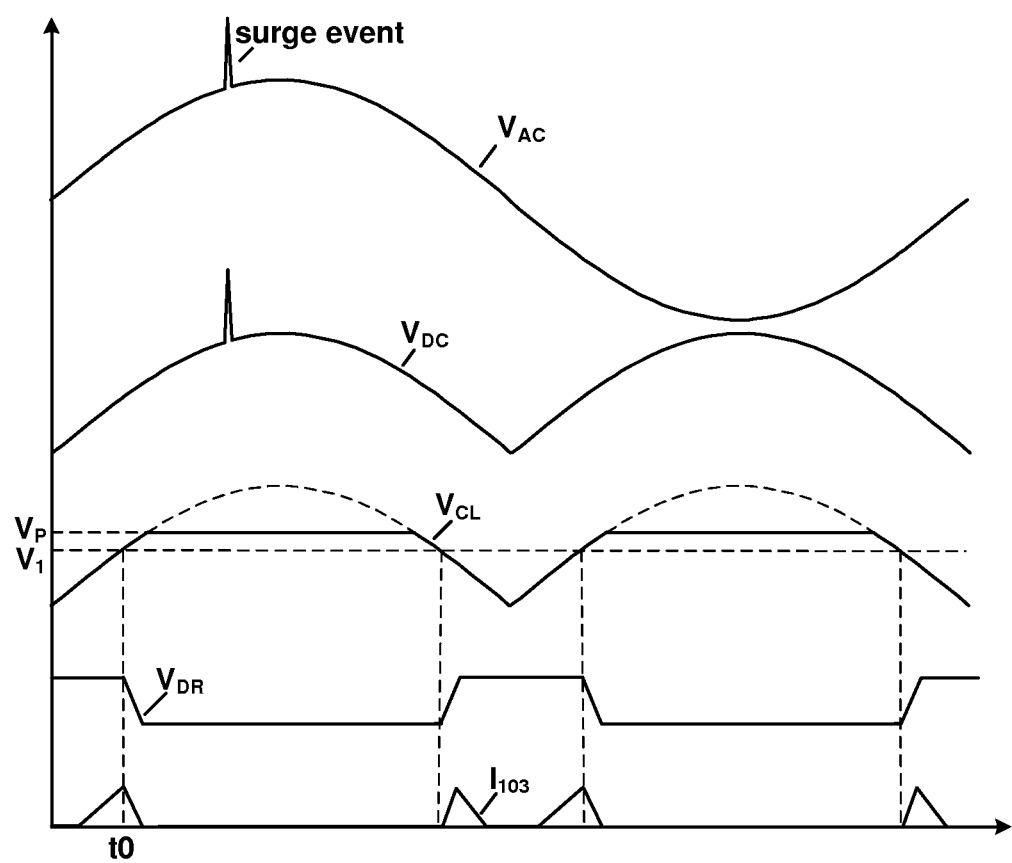
FIG. 5 schematically shows the waveforms of the input voltage $V_{AC}$, the rectified DC voltage $V_{DC}$, the clipped voltage $V_{CL}$, the driving signal $V_{DR}$, and the current $I_{103}$ flowing through the power switch 103 of the offline power converter 100 in FIG. 1 when a high voltage surge event happens during the off-time of the power switch 103.

For purpose of ease discussion, the surge event occurrence is shown during the falling period of the driving signal $V_{DR}$ in FIG. 3. However, the surge event may occur randomly, e.g., the surge event may happen during the on-time of the power switch 103, as shown in FIG. 4; or the surge event may happen during the off-time of the power switch 103, as shown in FIG. 5.

Figure 6:
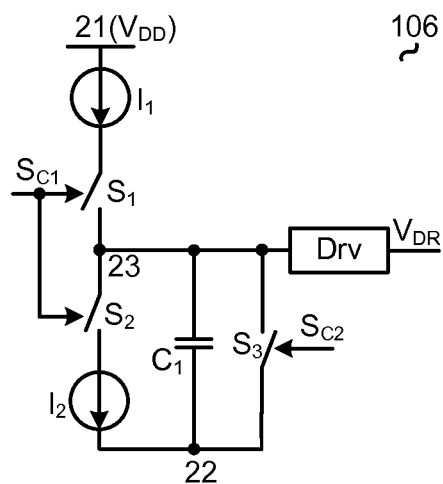
FIG. 6 schematically shows an example detailed circuit configuration of the logic and drive unit 106 of the offline power converter 100 in FIG. 1 in accordance with an embodiment of the present invention.

FIG. 6 schematically shows an example detailed circuit configuration of the logic and drive unit 106 of the offline power converter 100 in FIG. 1 in accordance with an embodiment of the present invention. In the example of FIG. 6, the logic and drive unit 106 comprises: a supply node 21 configured to receive a supply voltage $V_{DD}$; a reference node 22; a common node 23; a first current source $I_1$ and a first switch $S_1$ coupled in series between the supply node 21 and the common node 23; a second current source $I_2$ and a second switch $S_2$ coupled in series between the common node 23 and the reference node 22; a charge capacitor $C_1$ and a third switch $S_3$ coupled in parallel between the common node 23 and the reference node 22; and a driver Drv coupled to the common node 23 to receive a voltage across the charge capacitor $C_1$ to generate the driving signal $V_{DR}$; the first switch $S_1$ and the second switch $S_2$ respectively having a control terminal configured to receive the first comparison signal $S_{C1}$, and the third switch $S_3$ having a control terminal configured to receive the second comparison signal $S_{C2}$.

In the example of FIG. 6, the first switch $S_1$ is turned on and the second switch $S_2$ is turned off if the first sense signal $V_S$ is lower than the first threshold $V_{slowref}$, and the first switch $S_1$ is turned off and the second switch $S_2$ is turned on if the first sense signal $V_S$ is higher than the first threshold $V_{slowref}$. In the example of FIG. 6, the third switch $S_3$ is turned on if the second sense signal $V_{line}$ is higher than the second threshold $V_{fastref}$ and is turned off if the second sense signal $V_{line}$ is lower than the second threshold $V_{fastref}$.

In the example of FIG. 6, the second current source $I_2$ actually acts as current sink, i.e., the second current source $I_2$ discharges the charge capacitor $C_1$ when the second switch $S_2$ is turned on. However, one skilled in the art should realize that for illustration purpose, $I_2$ is still named as current source.

In one embodiment, the first current source $I_1$ and the second current source $I_2$ may be constant, variable or controlled variable current sources.

During the operation of the offline power converter 100, when the first sense signal $V_S$ is higher than the first threshold $V_{slowref}$, which indicates that the clipped voltage $V_{CL}$ goes higher than the slow threshold $V_1$, the first switch $S_1$ is turned off and the second switch $S_2$ is turned on. Accordingly, the charge capacitor $C_1$ is discharged by the second current source $I_2$ and the voltage across the charge capacitor $C_1$ decreases slowly. As a result, the driving signal $V_{DR}$ has a slow-sloping ramp down. If the offline power converter 100 encounters a surge event, which causes the input voltage $V_{AC}$ to increase rapidly suddenly, i.e., the input voltage $V_{AC}$ goes higher than a fast threshold, which indicates that the second sense signal $V_{line}$ goes higher than the second threshold $V_{fastref}$, the third switch $S_3$ is turned on. Accordingly, the charge capacitor $C_1$ is reset and the voltage across the charge capacitor $C_1$ decreases rapidly. As a result, the driving signal $V_{DR}$ has a substantial vertical ramp down.

Figure 7:
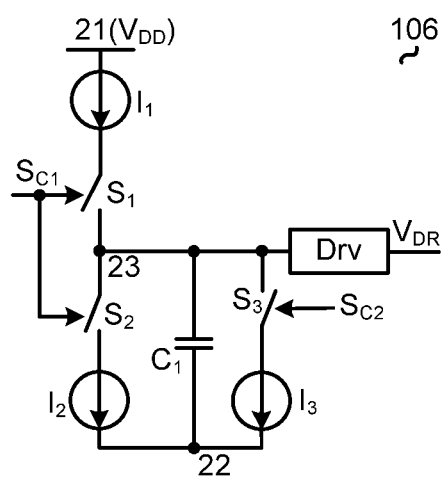
FIG. 7 schematically shows another example detailed circuit configuration of the logic and drive unit 106 of the offline power converter 100 in FIG. 1 in accordance with an embodiment of the present invention.

FIG. 7 schematically shows another example detailed circuit configuration of the logic and drive unit 106 of the offline power converter 100 in FIG. 1 in accordance with an embodiment of the present invention. The logic and drive unit in FIG. 7 is similar to that in FIG. 6, with a difference that the logic and drive unit 106 in FIG. 7 further comprises a third current source $I_3$ coupled in series with the third switch $S_3$ between the common node 23 and the reference node 22. The third current source $I_3$ provides a current that is much higher than the second current source $I_2$, so that the charge capacitor $C_1$ is quickly discharged by the third current source $I_3$ when the third switch $S_3$ is turned on, to provide the driving signal $V_{DR}$ having a substantial vertical ramp down if the second sense signal $V_{line}$ is higher than the second threshold $V_{fastref}$.

In the embodiments shown in FIG. 6 and FIG. 7, the driving signal is labeled as $V_{DR}$, which may be regarded as a buffered driving voltage replica of the signal at the common node 23, and may be regarded as being used to drive FET devices. However, the driving signal may also be a drive current replica of the signal at the common node 23, which is used to drive BJT devices.

In the example of FIG. 1, the first sense signal is derived from the clipped voltage $V_{CL}$, and the second sense signal is derived from the rectified DC signal $V_{DC}$. However, the first sense signal and the second sense signal may be derived both from the clipped voltage $V_{CL}$ or both from the rectified DC voltage $V_{DC}$.

Figure 8:
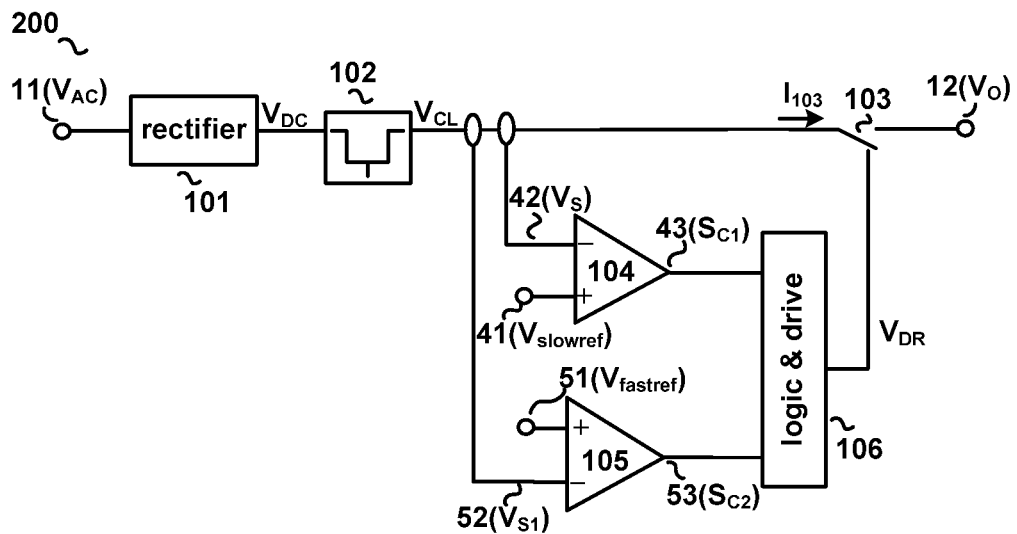
FIG. 8 schematically shows an offline power converter 200 in accordance with an embodiment of the present invention.

FIG. 8 schematically shows an offline power converter 200 in accordance with an embodiment of the present invention. The offline power converter 200 in FIG. 8 is similar to the offline power converter 100 in FIG. 1, with a difference that the second input terminal 52 of the second comparator 105 of the offline power converter 200 in FIG. 8 is configured to receive a sense voltage $V_{S1}$ indicative of the clipped voltage $V_{CL}$. The second comparator 105 generates the second comparison signal $S_{C2}$ based on the second threshold $V_{fastref}$ and the sense voltage $V_{S1}$. The operation of the offline power converter 200 is similar to that of the offline power converter 100.

Figure 9:
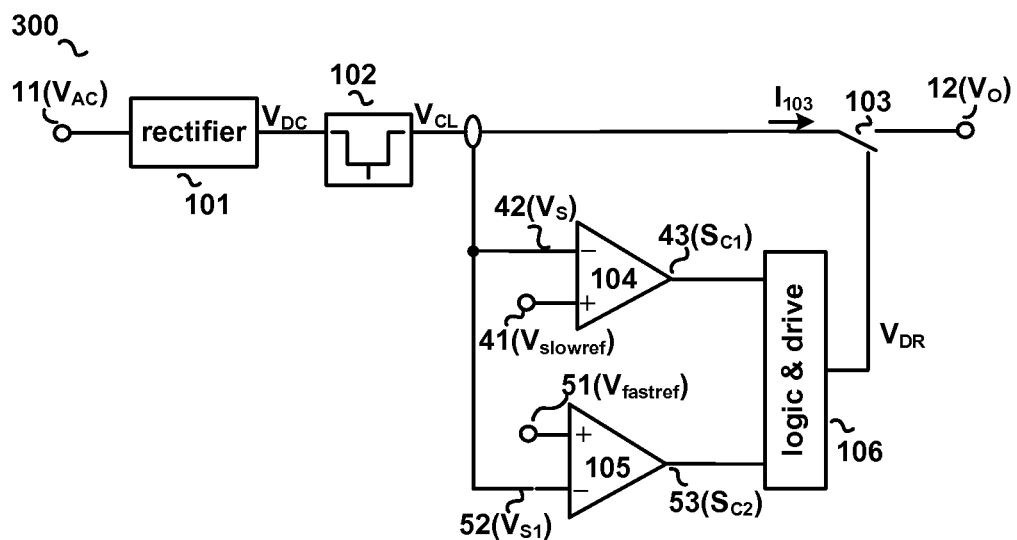
FIG. 9 schematically shows an offline power converter 300 in accordance with an embodiment of the present invention.

In the example of FIG. 8, the second input terminal 42 of the first comparator 104 and the second input terminal 52 of the second comparator 105 are not coupled together. However, in other embodiments, the second input terminal 42 of the first comparator 104 and the second input terminal 52 of the second comparator 105 may be coupled together, and the first sense signal $V_S$ and the sense voltage $V_{S1}$ may be the same signal, as show in FIG. 9.

Figure 10:
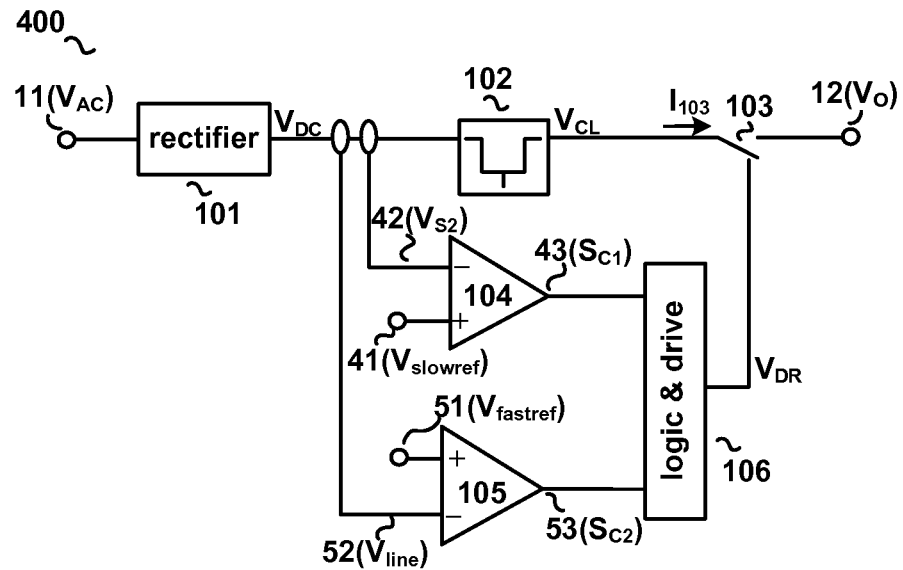
FIG. 10 schematically shows an offline power converter 400 in accordance with an embodiment of the present invention.

FIG. 10 schematically shows an offline power converter 400 in accordance with an embodiment of the present invention. The offline power converter 400 in FIG. 10 is similar to the offline power converter 100 in FIG. 1, with a difference that the second input terminal of the first comparator 104 is configured to receive a sense voltage $V_{S2}$ indicative of the rectified DC voltage $V_{DC}$. The first comparator 104 generates the first comparison signal $S_{C1}$ based on the first threshold $V_{slowref}$ and the sense voltage $V_{S2}$. The operation of the offline power converter 400 is similar to that of the offline power converter 100.

Figure 11:
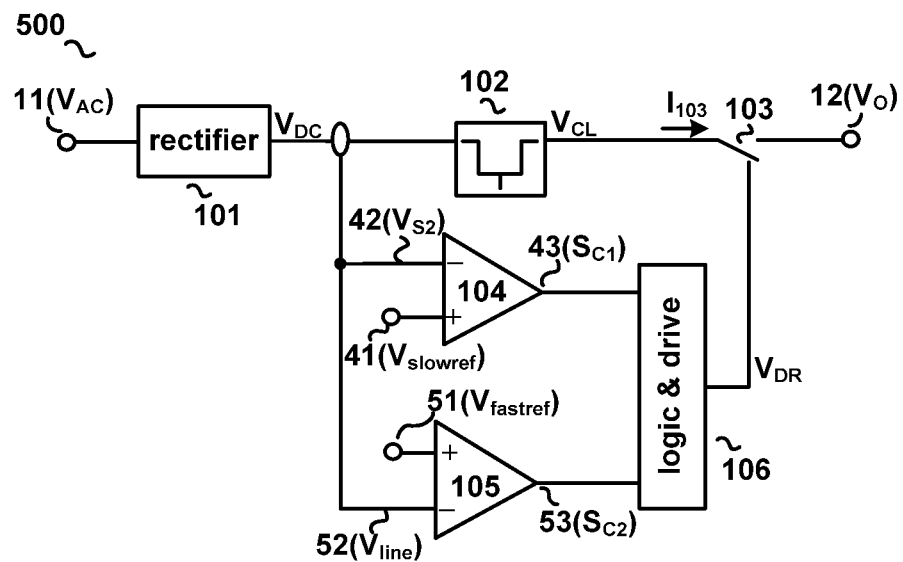
FIG. 11 schematically shows an offline power converter 500 in accordance with an embodiment of the present invention.

In the example of FIG. 10, the second input terminal 42 of the first comparator 104 and the second input terminal 52 of the second comparator 105 are not coupled together. However, in other embodiments, the second input terminal 42 of the first comparator 104 and the second input terminal 52 of the second comparator 105 may be coupled together, and the second sense signal $V_{line}$ and the sense voltage $V_{S2}$ may be the same signal, as show in FIG. 11.

Several embodiments of the foregoing offline power converter have low EMI and quick reaction compared to conventional technique discussed above. Unlike the conventional technique, several embodiments of the foregoing offline power converter slowly turn off the power switch at normal operation and fast turn off the power switch in response to surge event, thus reducing the EMI filter size and quickly preventing the system from being destructed when surge event happens. In addition, several embodiments of the foregoing offline power converter use a first threshold and a second threshold with a voltage gap between each other to distinct the normal operation and surge event to avoid interaction.

Figure 12:
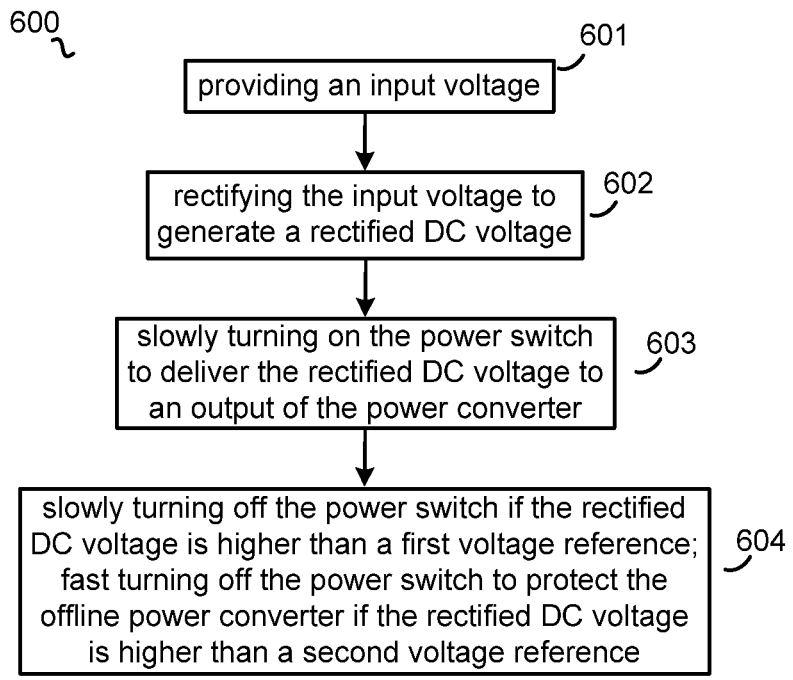
FIG. 12 schematic shows a flowchart 600 of a method used in an offline power converter in accordance with an embodiment of the present invention.

FIG. 12 schematic shows a flowchart 600 of a method used in an offline power converter in accordance with an embodiment of the present invention. The offline power converter comprises a power switch, the method comprising:

Step 601, providing an input voltage.

Step 602, rectifying the input voltage to generate a rectified DC voltage.

Step 603, slowly turning on the power switch to deliver the rectified DC voltage to an output of the power converter.

Step 604, slowly turning off the power switch if the rectified DC voltage is higher than a slow threshold; and fast turning off the power switch to protect the offline power converter if the rectified DC voltage is higher than a fast threshold.

In one embodiment, the fast threshold is relatively higher than the slow threshold.

In one embodiment, the fast threshold and the slow threshold may have hysteresis.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. An offline power converter, comprising:
an input port configured to receive an input voltage;
an output port configured to provide an output voltage;
a rectifier coupled to the input port to receive the input voltage, and to provide a rectified DC voltage based on the input voltage;
a normally-on power device coupled to the rectifier to receive the rectified DC voltage, and to provide a clipped voltage based on the rectified DC voltage;
a power switch having a first terminal, a second terminal and a control terminal, the first terminal being coupled to the normally-on power device to receive the clipped voltage, the second terminal being coupled to the output port;
a first comparator having a first input terminal configured to receive a first threshold, a second input terminal configured to receive a first sense signal indicative of the clipped voltage, and an output terminal configured to provide a first comparison signal based on the first threshold and the first sense signal;
a second comparator having a first input terminal configured to receive a second threshold, a second input terminal configured to receive a second sense signal indicative of the rectified DC voltage, and an output terminal configured to provide a second comparison signal based on the second threshold and the second sense signal; and
a logic and drive unit having a first input terminal coupled to the output terminal of the first comparator to receive the first comparison signal, a second input terminal coupled to the output terminal of the second comparator to receive the second comparison signal, and an output terminal configured to provide a driving signal to the control terminal of the power switch, the driving signal having a slow-sloping ramp down when the first sense signal goes higher than the first threshold, and having a substantial vertical ramp down when the second sense signal goes higher than the second threshold.

2. The offline power converter of claim 1, wherein the normally-on power device comprises either a depletion FET or an enhancement MOSFET.

3. The offline power converter of claim 1, wherein the logic and drive unit comprises:
a supply node configured to receive a supply voltage;
a reference node;
a common node;
a first current source and a first switch coupled in series between the supply node and the common node;
a second current source and a second switch coupled in series between the common node and the reference node;
a charge capacitor and a third switch coupled in parallel between the common node and the reference node; and
a driver coupled to the common node to receive a voltage across the charge capacitor to generate the driving signal; wherein
the first switch is turned on and the second switch is turned off if the first sense signal is lower than the first threshold, and the first switch is turned off and the second switch is turned on if the first sense signal is higher than the first threshold; and
the third switch is turned on if the second sense signal is higher than the second threshold, and is turned off if the second sense signal is lower than the second threshold.

4. The offline power converter of claim 1, wherein the logic and drive unit comprises:
a supply node configured to receive a supply voltage;
a reference node;
a common node;
a first current source and a first switch coupled in series between the supply node and the common node;
a second current source and a second switch coupled in series between the common node and the reference node;
a charge capacitor coupled between the common node and the reference node;
a third current source and a third switch coupled in series between the common node and the reference node, the third current source providing a current that is much higher than the second current source; and
a driver coupled to the common node to receive a voltage across the charge capacitor to generate the driving signal; wherein
the first switch is turned on and the second switch is turned off if the first sense signal is lower than the first threshold, and the first switch is turned off and the second switch is turned on if the first sense signal is higher than the first threshold; and
the third switch is turned on if the second sense signal is higher than the second threshold, and is turned off if the second sense signal is lower than the second threshold.

5. The offline power converter of claim 1, wherein the first threshold and the second threshold have hysteresis.

6. The offline power converter of claim 1, wherein the normally-on power device has a pinch-off voltage, and wherein the first threshold, the first sense signal, the clipped voltage, and the pinch-off voltage of the normally-on power device have respective values that satisfy the relationship $$\frac{V_{slowref}}{V_S} \le \frac{V_P}{V_{CL}}$$

wherein $V_{slowref}$ is a voltage value of the first threshold, $V_S$ is a voltage value of the first sense signal, $V_P$ is a voltage value of the pinch-off voltage of the normally-on power device, and $V_{CL}$ is a voltage value of the clipped voltage.

7. The offline power converter of claim 1, wherein the first threshold, the second threshold, the ratio of the first sense signal and the clipped voltage, and the ratio of the second sense signal and the rectified DC voltage have respective values that satisfy the relationship $$\frac{V_{fastref}}{k2} > \frac{V_{slowref}}{k1}$$

wherein $V_{slowref}$ is a voltage value of the first threshold, $V_{fastref}$ is a voltage value of the second threshold, k1 is the ratio of the first sense signal and the clipped voltage, and k2 is the ratio of the second sense signal and the rectified DC voltage.

\* \* \* \* \*